(No Model.) 2 Sheets—Sheet 1.
J. E. BARNARD & P. GEARY.
HARROW.
No. 332,581. Patented Dec. 15, 1885.
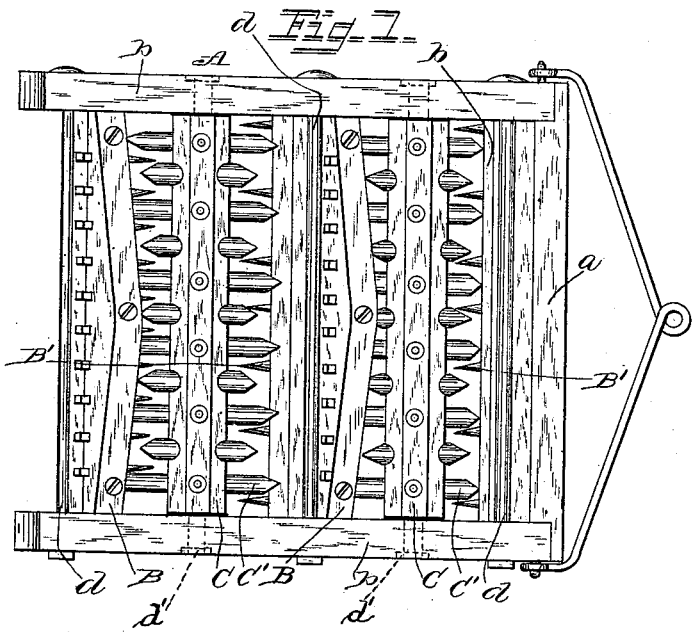
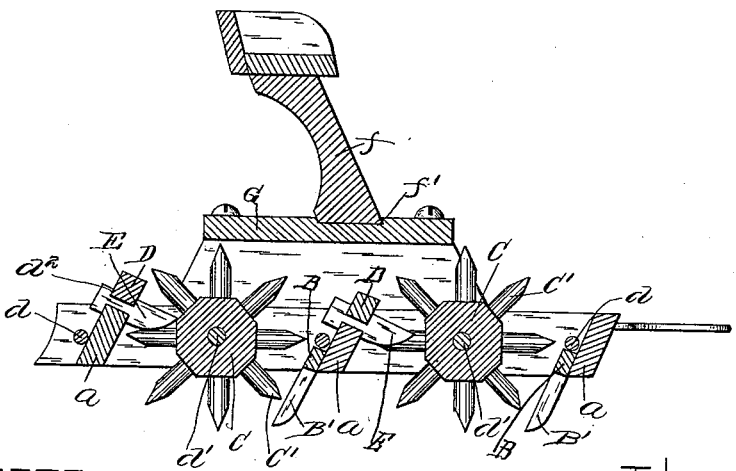

(No Model.) 2 Sheets—Sheet 2.
J. E. BARNARD & P. GEARY.
HARROW.
No. 332,581. Patented Dec. 15, 1885.
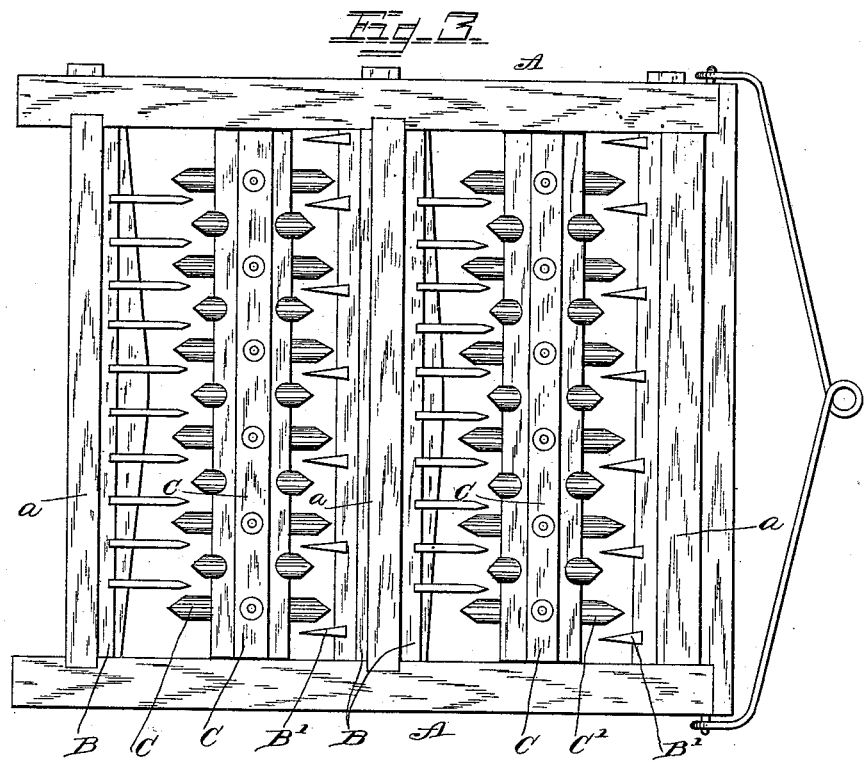

UNITED STATES PATENT OFFICE.

JAMES E. BARNARD AND PETER GEARY, OF STERLING, OHIO.

HARROW.

SPECIFICATION forming part of Letters Patent No. 332,581, dated December 15, 1885.

Application filed October 3, 1885. Serial No. 178,944. (No model.)

*To all whom it may concern:*

Be it known that we, JAMES E. BARNARD and PETER GEARY, citizens of the United States, residing at Sterling, in the county of Wayne and State of Ohio, have invented certain new and useful Improvements in Harrows, of which the following is a specification, reference being had therein to the accompanying drawings.

Our invention relates to an improvement in harrows; and it consists in the peculiar construction, combination, and arrangement of the parts of the device in order to embody in one and the same agricultural implement several parts, having in combination the functions of a harrow, leveler, and pulverizer, substantially as hereinafter more fully shown and described.

In the accompanying drawings, Figure 1 is a plan view of our harrow. Fig. 2 is a longitudinal section on the line $x\ x$, Fig. 1; and Fig. 3 is an inverted plan view thereof.

In thus constructing in one and the same agricultural implement parts designed for use in diverse operations—as harrowing, leveling, and pulverizing—we secure in frame A the toothed bars B, the upper portions of which are inclined forwardly, and are inserted in corresponding mortises or recesses provided in the longitudinal frame-bars $b$, and retained rigidly in position by means of the nutted frame-rods $d$, one of which is disposed immediately above each bar, and each of these bars is provided with a suitable number of pointed teeth, B', projecting obliquely rearward, which, in practice, prepare the soil for action of the teeth of cylinders C. The cylinders C, having the pointed teeth C' constructed and arranged in any well-known manner, are secured in frame A by means of the nutted frame-rods $d'$, which project centrally and longitudinally one through each cylinder, of which it thus becomes the journal, the cylinders each having disks centrally apertured, one of which is secured laterally thereto at either end thereof, or it may be cast integral therewith.

The levelers $a$ consist, respectively, of the front, middle, and rear bars of frame A, and are designed to smooth and level the soil. The leveler $a$, located in the center of the frame A, is secured in the mortise or recess provided in the longitudinal frame-bars for the toothed bars B, said leveler being inserted prior to the insertion of the central nutted frame-rod $d$, which also serves to secure the said leveler in position.

In rear of the cylinders C are provided the beveled clamp-bars D, which are designed to rigidly hold in position teeth or knives E E. These teeth are designed for pulverizing and removing the earth as it adheres to the teeth of the cylinders, and also for removing other obstructions therefrom, which are collected thereon in passing over the soil. The clamp-bars D are provided with the vertical recesses $d^2$, arranged at slight intervals apart, which register with corresponding recesses provided in the upper surfaces of the levelers $a$. These recesses have inserted therein the teeth or knives E, which are adjustably secured in position by means of the clamp bars D, which are bolted to the levelers $a$. The knives E, thus secured by clamp-bars D, and which project obliquely in proximity to teeth C, may be projected to a greater or less extent toward said teeth, as may prove desirable in practice.

The cover G serves as a platform whereon the seat of the driver is secured, the seat-standard $f$ being bolted in recess $f''$. The cover G may be hinged to frame A in any well-known manner, in order that it may be turned down when desired, instead of lifting it off the harrow.

Having thus fully described our invention, what we claim, and desire to secure by Letters Patent, is—

1. In a harrow, the combination, with the toothed cylinders having journals secured to each frame-bar, of the toothed bars secured in mortises in the longitudinal frame-bars, the levelers having recesses in their upper surfaces, and the clamp-bars for securing teeth in the recesses in said levelers, said levelers and toothed bars being rigidly secured by nutted rods, substantially as shown and described.

2. In a harrow, the combination, with the toothed cylinders, of the toothed bars, the levelers and clamp-bars, said levelers and clamp-bars having corresponding recesses for securing teeth E, and the nutted rods, substantially as shown and described.

In testimony whereof we affix our signatures in presence of two witnesses.

JAMES E. BARNARD.
PETER GEARY.

Witnesses:
G. W. ROSS,
JOHN LEE, Jr.